US008688289B2

(12) United States Patent
Salsbery et al.

(10) Patent No.: US 8,688,289 B2
(45) Date of Patent: Apr. 1, 2014

(54) METHOD AND SYSTEM FOR PREEMPTING THERMAL LOAD BY PROACTIVE LOAD STEERING

(75) Inventors: Brian J. Salsbery, Boulder, CO (US); Norman S. Gargash, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 504 days.

(21) Appl. No.: 13/178,281

(22) Filed: Jul. 7, 2011

(65) Prior Publication Data

US 2013/0013126 A1 Jan. 10, 2013

(51) Int. Cl.
*G05D 23/00* (2006.01)
*G06F 1/00* (2006.01)
*G06F 1/26* (2006.01)
*G06F 9/46* (2006.01)

(52) U.S. Cl.
USPC ........... 700/299; 713/300; 713/320; 718/102; 718/104; 718/105

(58) Field of Classification Search
USPC .......... 700/299; 713/300, 320, 322, 323, 324; 718/100, 102, 104, 105
See application file for complete search history.

(56) References Cited

U.S. PATENT DOCUMENTS

| 5,452,401 | A | 9/1995 | Lin |
|---|---|---|---|
| 7,461,275 | B2 | 12/2008 | Belmont et al. |
| 7,617,403 | B2 | 11/2009 | Capps et al. |
| 8,291,420 | B2 * | 10/2012 | Koo et al. .................. 718/102 |
| 8,589,931 | B2 * | 11/2013 | Barsness et al. ............ 718/102 |
| 2003/0110012 | A1 | 6/2003 | Orenstien et al. |
| 2004/0262409 | A1 * | 12/2004 | Crippen et al. .............. 236/49.3 |
| 2006/0064999 | A1 | 3/2006 | Hermerding et al. |
| 2006/0095911 | A1 * | 5/2006 | Uemura et al. .............. 718/100 |
| 2006/0218423 | A1 | 9/2006 | Diefenbaugh et al. |

(Continued)

FOREIGN PATENT DOCUMENTS

| EP | 1655655 A2 | 5/2006 |
|---|---|---|
| WO | 2009027153 A1 | 3/2009 |

OTHER PUBLICATIONS

Coskun, A.K. et al., "Static and Dynamic Temperature-AwareScheduling for Multiprocessor SoCs", IEEE Transactions on Very Large Scale Integration (VLSI) Systems, IEEE Service Center, Piscataway, NJ, USA,vol. 15, No. 9, Sep. 1, 2008, pp. 1127-1140, XP011232329, ISSN: 1063-8210 paragraph [0001]-paragraph [00VI].

(Continued)

*Primary Examiner* — Mohammad Ali
*Assistant Examiner* — Jennifer L Norton
(74) *Attorney, Agent, or Firm* — Nicholas A. Cole

(57) ABSTRACT

A method and system for maximizing a quality of service ("QoS") level in a portable computing device ("PCD") by preempting the generation of thermal energy in excess of a threshold are disclosed. The method includes receiving a workload request for a processing component within the PCD. A processing component is selected for allocation of the workload based on thermal factors associated with the processing component. Thermal factors may comprise data indicative of real-time thermal energy generation near the processing component, predictive data derived from known characteristics of heat producing components that are physically proximate to the processing component, queued workload burdens for the processing component, etc. A processing component is selected for allocation of the workload based on the thermal factors. By leveraging the thermal factors to allocate workloads, thermal generation can be proactively managed such that reliance on reactive thermal mitigation techniques, which negatively impact QoS, can be reduced.

40 Claims, 6 Drawing Sheets

(56) References Cited

U.S. PATENT DOCUMENTS

2009/0135751 A1 5/2009 Hodges et al.
2010/0322126 A1 12/2010 Krishnaswamy et al.

OTHER PUBLICATIONS

International Search Report and Written Opinion—PCT/US2012/040872—ISA/EPO—Apr. 24, 2013.

* cited by examiner

METHOD AND SYSTEM FOR PREEMPTING THERMAL LOAD BY PROACTIVE LOAD STEERING

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

One unique aspect of PCDs is that they typically do not have active cooling devices, like fans, which are often found in larger computing devices such as laptop and desktop computers. As such, instead of using fans to manage thermal energy generation, a PCD may leverage policies that serve to reduce the amount of thermal energy that is being actively generated by its processing components. For example, some thermal management policies seek to reduce thermal energy generation in the PCD by reallocating workload from an overburdened processing component to an alternate processing component. Other thermal management policies seek to manage the active generation of thermal energy by lowering the power frequency supplied to the processing components.

One aspect of current thermal management policies is that they are often leveraged at the expense of user experience. For example, by moving a workload burden from a sub-processor having a high power density to a main processor with a lower power density, thermal energy generation may be mitigated at the cost of computational speed. That is, quality of service ("QoS") may suffer due to the workload having been reallocated from the fast sub-processor to the slower main processor. Similarly, by simply reducing the clock speed at which a processor is running, the processor may generate less thermal energy but will lose processing efficiency.

Another aspect of current thermal management policies is that they are reactive. Default workload allocation algorithms are manipulated by current thermal management policies only when a condition of excess thermal energy has been identified in the PCD. Likewise, processor clock speeds are not reduced unless the processor is already "running hot" or trending that way.

Simply stated, the "why" for implementing current thermal management techniques is usually because something in the PCD is, or is getting, hot. Consequently, the solution provided by current thermal management techniques is to mitigate the ongoing generation of thermal energy. Current thermal management techniques are not implemented because something in the PCD is likely to, or is anticipated to, get hot. Current thermal management techniques do not proactively manage thermal energy generation in a PCD.

Accordingly, what is needed in the art is a method and system for maximizing PCD performance by preempting the generation of excess thermal energy.

SUMMARY OF THE DISCLOSURE

A method and system for maximizing a quality of service ("QoS") level in a portable computing device ("PCD") by preempting the generation of thermal energy in excess of a threshold are disclosed. The method includes receiving a workload request for allocation to a processing component within a PCD comprising multiple processing components. Upon receipt of the workload request, a processing component is selected for allocation of the workload based on any number of combinations of thermal factors associated with the processing component. Exemplary thermal factors may comprise data indicative of real-time thermal energy generation near the processing component, such as thermal sensor measurements. Other exemplary thermal factors may comprise predictive data derived from known characteristics of heat producing components that are physically proximate to the processing component. Still other exemplary thermal factors may represent queued workload burdens for the processing component.

The thermal factors are leveraged to assign an eligibility factor to each of the processing components. Based on the eligibility factor, a processing component is selected for allocation of the workload. Advantageously, by considering the various thermal factors in selection of the processing component, thermal generation in the PCD can be proactively managed in such a way that reliance on reactive thermal mitigation techniques, which negatively impact QoS, can be reduced.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
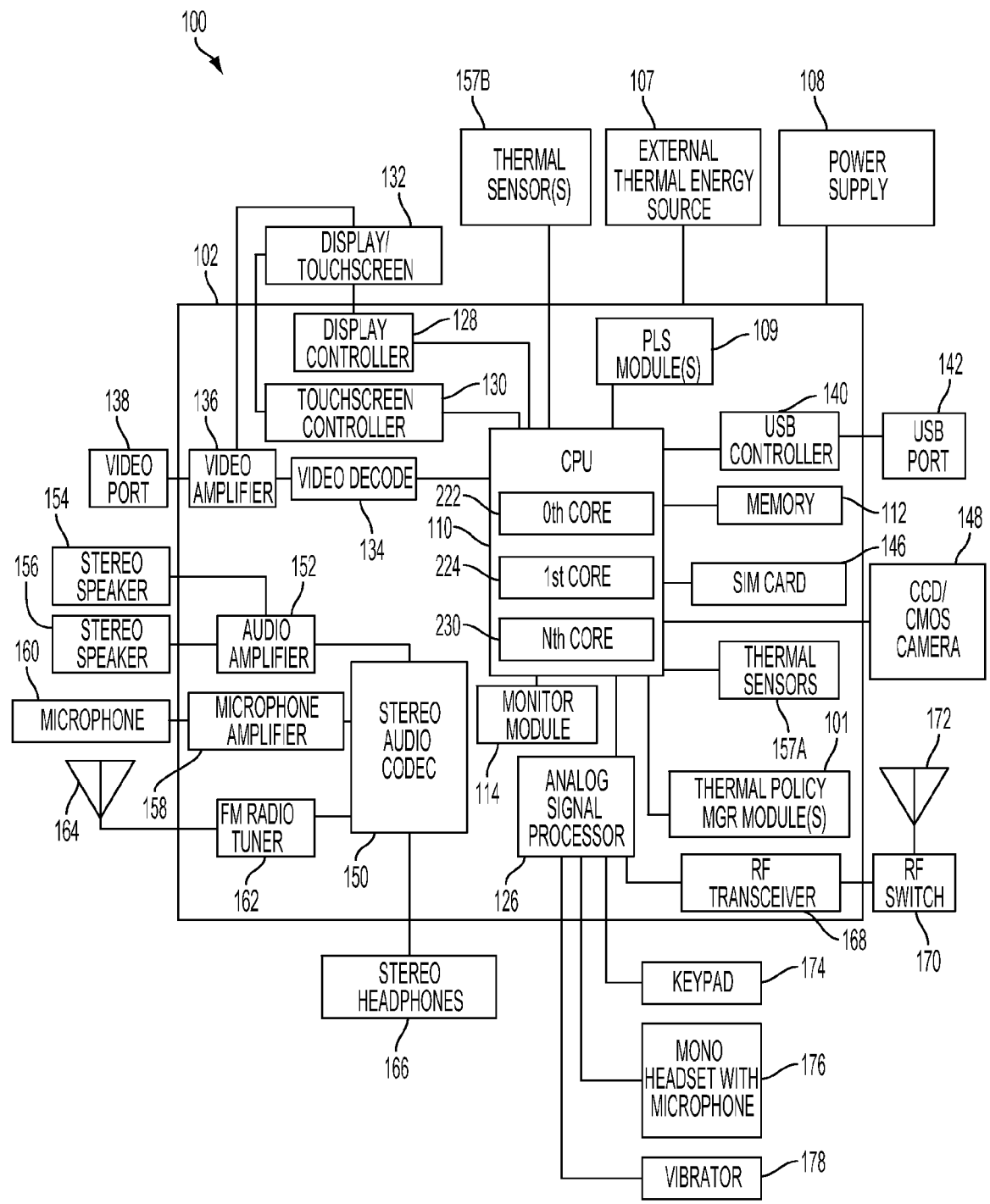
FIG. 1 is a functional block diagram of an exemplary, non-limiting aspect of a portable computing device ("PCD") in the form of a wireless telephone for implementing methods and systems for recognizing thermal conditions and managing proactive load steering policies.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content," as referred to herein, may also include files that are not executable in nature, such as documents that may need to be opened or other data files that need to be accessed.

As used in this description, the terms "component," "database," "module," "system," "thermal energy generating component," "processing component," "driver" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device" and "wireless handset" are used interchangeably. With the advent of third generation ("3G") and fourth generation ("4G") wireless technology, greater bandwidth availability has enabled more portable computing devices with a greater variety of wireless capabilities.

In this description, the terms "central processing unit ("CPU")," "digital signal processor ("DSP")," and "chip" are used interchangeably.

In this description, it will be understood that the terms "thermal" and "thermal energy" may be used in association with a device or component capable of generating or dissipating energy that can be measured in units of "temperature." Consequently, it will further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

In this description, the terms "workload," "process load" and "process workload" are used interchangeably and generally directed toward the processing burden, or percentage of processing burden, associated with a given processing component in a given embodiment. Further to that which is defined above, a "processing component," "computational block" or "thermal energy generating component" may be, but is not limited to, a central processing unit, a graphical processing unit, a core, a main core, a sub-core, a processing area, a hardware engine, etc. or any component residing within, or external to, an integrated circuit within a portable computing device. Moreover, to the extent that the terms "thermal load," "thermal distribution," "thermal signature," "thermal processing load" and the like are indicative of workload burdens that may be running on a processing component, one of ordinary skill in the art will acknowledge that use of these "thermal" terms in the present disclosure may be related to process load distributions, process burdens and process rates.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") wireless technology have enabled numerous PCDs with multiple capabilities. Therefore, a PCD may be a cellular telephone, a satellite telephone, a pager, a PDA, a smartphone, a navigation device, a smartbook or reader, a tablet computer, a media player, a combination of the aforementioned devices, a laptop computer with a wireless connection, among others.

In this description, the terms "driver," "driver block," "driver component" and the like are used interchangeably to refer to any component within a PCD that may allocate, reallocate or otherwise distribute workload to a component, or components, within a PCD operable to process the workload. As such, one of ordinary skill in the art will recognize that a "driver," "driver block," "driver component," "workload driver" or the like may be, but is not limited to being, a graphics scheduler, an operating system ("O/S") scheduler, etc.

In a typical scenario, a portable computing device ("PCD") may process a certain number of millions of instructions per second ("MIPS") by running a processing core at full processing power. When doing so, the core will consume a certain amount of power. This causes the dissipation of an associated amount of generated thermal energy. The thermal energy generated by a processing core running at full processing power may, or may not, be detrimental to the PCD. Moreover, the thermal energy generated by a component physically proximate to a running processing core may, or may not, be detrimental to PCD functionality. However, in the event that the thermal energy required to be dissipated, regardless of source, is detrimental or potentially catastrophic to the PCD, countermeasures may be taken to either reduce the workload burden on the processing core or reduce the power at which the core is running Either way, QoS will suffer.

In theory, a perfectly balanced PCD system design would naturally exhibit thermally balanced qualities such that workloads could be distributed without creating a thermal load that necessitates a reactive thermal mitigation countermeasure. In such an ideal scenario, reactive thermal mitigation countermeasures may not be necessary as often because thermal loads could be effectively managed via simple "round robin" allocation algorithms that result in a maintained thermal equilibrium across the PCD.

As one of ordinary skill in the art can attest, however, such an ideal scenario is not reality. Today's PCDs place a lot of functionality into a very small physical package. Consequently, processing components are usually not evenly spaced throughout a PCD. On the contrary, components are often shoehorned into a PCD wherever space can be found. Further, it is inevitable that some processing components in a PCD will be located near other thermal energy generating components while other processing components will reside in "cooler" locations. Moreover, factors such as user use patterns and processing component specifications often combine with other factors to make uniform workload allocation impractical.

A thermal mitigation technique that weighs both present and predicted thermal factors when steering workload to a processing component in a PCD may maximize user experience and avoid the unnecessary generation of thermal energy. Notably, if the generation of potentially detrimental thermal energy can be avoided, the implementation of reactive thermal mitigation techniques in the PCD may be necessary less often. Advantageously, by leveraging a proactive thermal mitigation technique, a high QoS level may be maintained in use cases that otherwise would cause thermal conditions that trigger the need for reactive mitigation techniques.

A proactive load steering technique may be able to either preempt the generation of thermal load or dictate that the thermal load is generated at an optimum time and location within the PCD. For example, an exemplary proactive load steering technique may consider any number of present and predicted conditions within the PCD before allocating a workload to a processing component. Factors that a proactive load steering technique may consider before allocating workload include, but are not limited to, physical die placement of processing components, proximity of processing components to known thermal energy generating components, thermal tendencies inherent to the hardware layout on the chip, quantity of eligible processing components in the PCD, real-time temperature measurements, real-time workload burdens, queued workload burdens, processing component specifications, historical data associated with various components in the PCD, historical data related to user actions or patterns, etc.

A non-limiting example of a situation in which a PCD may leverage a proactive load steering technique to avoid detrimental generation of thermal energy while maintaining a high level of QoS is illustrated by a user on an airplane. Suppose, for example, that a PCD user has recently placed the PCD in "airplane mode." As one of ordinary skill in the art would know, placing a PCD in "airplane mode" may disable its signal transmitting functions such that the user may not place or receive communications, even though other functionality of the PCD is still available to the user.

Returning to the exemplary situation, a certain high power density sub-processor may be physically proximate in the PCD to a radio frequency ("RF") generator component that is notorious for dissipating high amounts of thermal energy. Because the PCD was only recently placed in airplane mode, the RF generator component may still be hot from recent use. The user may start the execution of a gaming application on the PCD that causes a workload request. Consequently, because the gaming application requires processing at a high computational efficiency for the best user experience, a driver block in the PCD defaults to assign the workload request to the high power density sub-processor.

In the example, temperature readings indicate that the area around the certain sub-processor is close to a thermal threshold, perhaps attributable to the hot RF generator component. Because of the thermal condition, a reactive thermal mitigation policy may override the default allocation and dictate that the workload request be allocated to a main processor having lower power density. In such a situation, one of ordinary skill in the art will recognize that the user experience in the provision of the gaming interface may suffer due to the slower computation efficiency of the main processor. In a PCD that leverages a proactive load steering technique, the fact that the PCD has been recently placed in airplane mode may be weighted in the allocation algorithm such that the present temperature measured near the certain sub-processor is discounted. That is, because the RF generator component has been disabled, it can be inferred that the thermal energy dissipation associated with the RF generator will continue to decrease and, as such, a proactive load steering technique may elect to allocate the gaming workload to the certain sub-processor.

The above example is offered for illustrative purposes only and is not intended to, nor does it, limit the scope of scenarios in which a proactive load steering technique may be leveraged. Moreover, the above example does not limit the factors, or combination of factors, that may be weighted and considered by any given embodiment of a proactive load steering method or system. As such, one of ordinary skill in the art will recognize that any given embodiment of a proactive load steering method or system is not limited to leveraging any particular thermally related factor, or combination of factors, prior to allocating a processing workload in a PCD.

FIG. 1 is a functional block diagram of an exemplary, non-limiting aspect of a PCD 100 in the form of a wireless telephone for implementing methods and systems for recognizing thermal conditions and managing proactive load steering policies. Per some embodiments, PCD 100 may be configured to manage and/or avoid thermal load associated with instructions processing. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art.

In general, the thermal policy manager module(s) 101 may be responsible for monitoring and applying thermal policies that include one or more thermal mitigation techniques that may help a PCD 100 manage thermal conditions and/or thermal loads and avoid experiencing adverse thermal conditions, such as, for example, reaching critical temperatures, while maintaining a high level of functionality.

FIG. 1 also shows that the PCD 100 may include a monitor module 114. The monitor module 114 communicates with multiple operational sensors (e.g., thermal sensors 157) distributed throughout the on-chip system 102 and with the CPU 110 of the PCD 100 as well as with the thermal policy manager module 101. The thermal policy manager module 101 may work with the monitor module 114 and the proactive load steering ("PLS") module(s) 109 to identify adverse thermal conditions and apply thermal policies that include one or more thermal mitigation techniques as will be described in further detail below.

As illustrated in FIG. 1, a display controller 128 and a touch screen controller 130 are coupled to the digital signal processor 110. A touch screen display 132 external to the on-chip system 102 is coupled to the display controller 128 and the touch screen controller 130.

PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core central processing unit ("CPU") 110. A video amplifier 136 is coupled to the video encoder 134 and the touch screen display 132. A video port 138 is coupled to the video amplifier 136. As depicted in FIG. 1, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 1, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 108, for example a battery, is coupled to the on-chip system 102. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller 103 (See FIG. 2). However, other types of thermal sensors 157 may be employed without departing from the scope of the invention.

The thermal sensors 157, in addition to being controlled and monitored by an ADC controller 103, may also be controlled and monitored by one or more thermal policy manager module(s) 101 and/or PLS module(s) 109. The thermal policy manager module(s) 101 may comprise software which is executed by the CPU 110. However, the thermal policy manager module(s) 101 may also be formed from hardware and/or firmware without departing from the scope of this disclosure. The thermal policy manager module(s) 101 may be responsible for monitoring and applying thermal policies that include one or more thermal mitigation techniques that may help a PCD 100 avoid critical temperatures while maintaining a high level of functionality. Similarly, the PLS module(s) 109 may comprise software which is executed by the CPU 110. However, the PLS module(s) 109 may also be formed from hardware and/or firmware without departing from the scope of this disclosure. The PLS module(s) 109, working in concert with driver block(s) 207 and sensors 157 may be responsible for applying thermal policies that include one or more thermal mitigation techniques that may help a PCD 100 avoid critical temperatures while maintaining a high level of functionality.

FIG. 1 also shows that the PCD 100 may include a monitor module 114. The monitor module 114 communicates with multiple operational sensors distributed throughout the on-chip system 102 and with the CPU 110 of the PCD 100 as well as with the thermal policy manager module 101 and PLS module 109. Either or both of the modules 101, 109 may work with the monitor module to apply thermal policies that include one or more thermal mitigation techniques as will be described in further detail below.

FIG. 1 further shows that the touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, the power supply 108 and various sources of thermal energy 107 are external to the on-chip system 102. However, it should be understood that the monitor module 114 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112 that form the one or more thermal policy manager module(s) 101 and/or proactive load steering module(s) 109. These instructions that form the module(s) may be executed by the CPU 110, the analog signal processor 126, or another processor, in addition to the ADC controller 103 to perform the methods described herein. Further, the processors 110, 126, the memory 112, the instructions stored therein, or a combination thereof may serve as a means for performing one or more of the method steps described herein.

Figure 2:
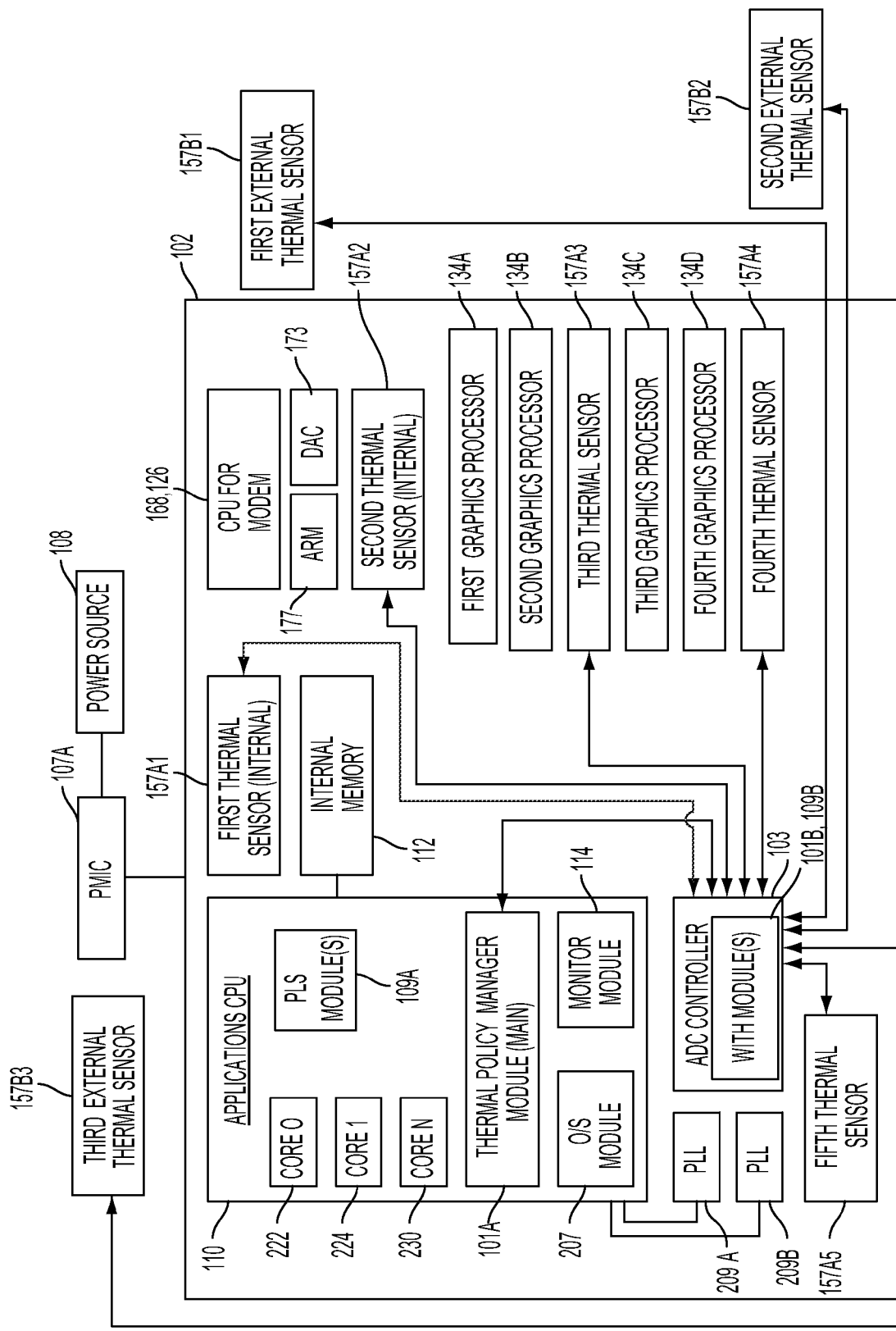
FIG. 2 is a functional block diagram illustrating an exemplary spatial arrangement of hardware for the chip illustrated in FIG. 1.

FIG. 2 is a functional block diagram illustrating an exemplary spatial arrangement of hardware for the chip 102 illustrated in FIG. 1. According to this exemplary embodiment, the applications CPU 110 is positioned on the far left side region of the chip 102 while the modem CPU 168, 126 is positioned on a far right side region of the chip 102. The applications CPU 110 may comprise a multi-core processor that includes a zeroth core 222, a first core 224, and an Nth core 230. The applications CPU 110 may be executing a thermal policy manager module 101A and/or a proactive load steering module 109A (when embodied in software) or it may include a thermal policy manager module 101A and/or a proactive load steering module 109A (when embodied in hardware). The application CPU 110 is further illustrated to include operating system ("O/S") module 207A and a monitor module 114.

The applications CPU 110 may be coupled to one or more phase locked loops ("PLLs") 209A, 209B, which are positioned adjacent to the applications CPU 110 and in the left side region of the chip 102. Adjacent to the PLLs 209A, 209B and below the applications CPU 110 may comprise an analog-to-digital ("ADC") controller 103 that may include its own thermal policy manager 101B and/or proactive load steering module 109B that works in conjunction with the main module(s) 101A, 109A of the applications CPU 110.

The module(s) 101B, 109B of the ADC controller 103 may be responsible for monitoring and tracking multiple thermal sensors 157 that may be provided "on-chip" 102 and "off-chip" 102. The on-chip or internal thermal sensors 157A may be positioned at various locations.

For example, a first internal thermal sensor 157A1 may be positioned in a top center region of the chip 102 between the applications CPU 110 and the modem CPU 168,126 and adjacent to internal memory 112. A second internal thermal sensor 157A2 may be positioned below the modem CPU 168, 126 on a right side region of the chip 102. This second internal thermal sensor 157A2 may also be positioned between an advanced reduced instruction set computer ("RISC") instruction set machine ("ARM") 177 and a first graphics processor 135A. A digital-to-analog controller ("DAC") 173 may be positioned between the second internal thermal sensor 157A2 and the modem CPU 168, 126.

A third internal thermal sensor 157A3 may be positioned between a second graphics processor 135B and a third graphics processor 135C in a far right region of the chip 102. A fourth internal thermal sensor 157A4 may be positioned in a far right region of the chip 102 and beneath a fourth graphics processor 135D. And a fifth internal thermal sensor 157A5 may be positioned in a far left region of the chip 102 and adjacent to the PLLs 209 and ADC controller 103.

One or more external thermal sensors 157B may also be coupled to the ADC controller 103. The first external thermal sensor 157B1 may be positioned off-chip and adjacent to a top right quadrant of the chip 102 that may include the modem CPU 168, 126, the ARM 177, and DAC 173. A second external thermal sensor 157B2 may be positioned off-chip and adjacent to a lower right quadrant of the chip 102 that may include the third and fourth graphics processors 135C, 135D. A third external thermal sensor 157B3 may be positioned off-chip and adjacent to an external thermal energy source 107 such as the exemplary power management integrated circuit ("PMIC") 107A.

One of ordinary skill in the art will recognize that various other spatial arrangements of the hardware illustrated in FIG. 2 may be provided without departing from the scope of the disclosure. FIG. 2 illustrates yet one exemplary spatial arrangement and how the main module(s) 101A, 109A and ADC controller 103 with its module(s) 101B, 109B may manage thermal conditions that are a function of the exemplary spatial arrangement illustrated in FIG. 2.

Figure 3:
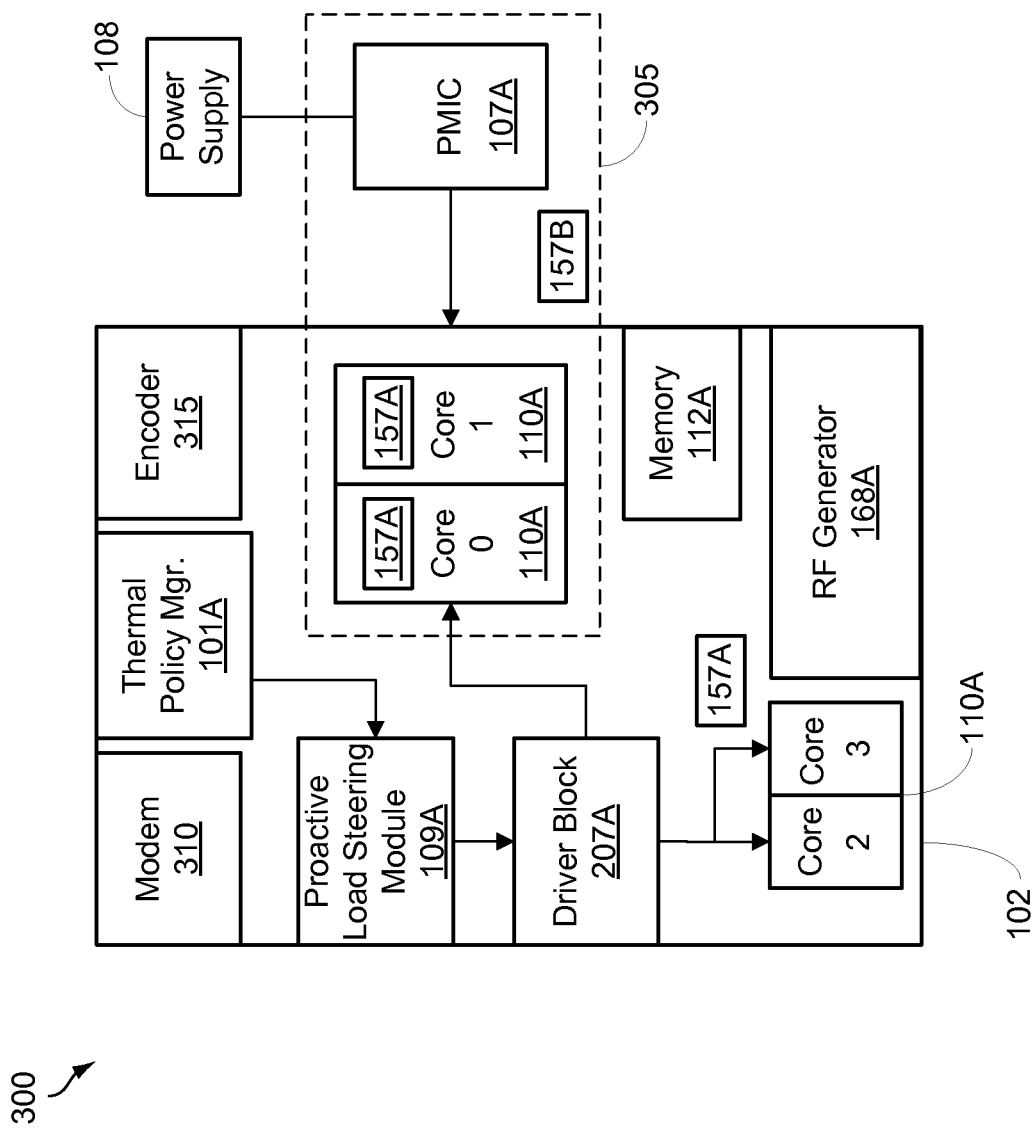
FIG. 3 is a functional block diagram illustrating an exemplary spatial arrangement of hardware for the chip illustrated in FIG. 1 and exemplary components external to the chip illustrated in FIG. 1.

FIG. 3 illustrates an exemplary floor plan 300 of an application specific integrated circuit ("ASIC") 102 that may benefit from the application of various thermal mitigation techniques such as the proactive load steering techniques described herein. In the FIG. 3 illustration, modem component 310 and encoder component 315 are included to represent exemplary PCD components that may reside on an ASIC 102. The distributed processing cores of CPU bank 110A along with RF generator 168A represent the primary components generating thermal energy on ASIC 102. A power management integrated circuit ("PMIC") 107A, for example, does not reside on ASIC 102, but is represented as being in proximity 305 to processing cores 0 and 1 of CPU 110A.

PMIC 107A, as well as other components residing within PCD 100, may be placed in immediate proximity 305 to processing cores 0 and 1, thereby generating a bias in the processing cores for a higher average operating temperature when the thermal energy dissipated from the components propagates through the cores. One of ordinary skill in the art will recognize that the adverse affect of these proximate components on processing core temperature may be predictable in various PCD 100 configurations and/or use cases. As such, one of ordinary skill in the art will also recognize that an advantage of proactive load steering algorithms is that thermal factors attributable to tasks performed, or queued to be performed, by non-computational components in a PCD 100 may be weighted. By weighting thermal factors and other conditions, workloads may be allocated to processors in a manner that precludes the generation of thermal energy to a level that would necessitate reactive thermal mitigation techniques.

For example, due to limited physical space within a PCD 100, PMIC 107A may reside immediately behind and adjacent to ASIC 102. As such, one of ordinary skill in the art will recognize that thermal energy dissipated from PMIC 107A, or other external heat generating components, may adversely affect temperature readings taken from sensors 157 on either of cores 0 and 1 within CPU 110A. As a non-limiting application of a proactive load steering embodiment, thermal policy manager 101A may recognize from sensors 157A that PMIC 107A has caused cores 0 and 1 to approach a thermal threshold. As such, reactive thermal mitigation techniques may instruct that the processing power provided to the cores be reduced in an effort to quell the continued rise in thermal dissipation. However, instead of allocating workload requests to cores 2 and 3, proactive load steering module 109A may discount the temperature measured in proximity 305 due to confirmation that power supply 108 has reached full charge. Notably, because the charge level of power supply 108 is verified as fully charged, PLS module 109A may be able to deduce that thermal energy generated by PMIC 107A, and reflected in the temperature measurement received by the TPM module 101A, will not continue but begin to wane. As such, the temperature monitored by TPM module 101A may be discounted to a point that PLS module 109A dictates driver block 207A to allocate to cores 0 and 1 workload requests particularly suitable to those cores despite the present thermal condition of proximity 305. Advantageously, because PLS module 109A was able to deduce that the temperature in proximity 305 will be waning, reactive thermal mitigation techniques that would otherwise have downgraded the processing power of cores 0 and 1, based on the real-time temperature measurement in proximity 305, may be avoided and QoS maximized.

As another non-limiting example of a proactive load steering embodiment in the context of the exemplary floor plan 300, core 3 may have been downgraded for work allocation due to excessive thermal energy dissipated by RF generator 168A. TPM module 101A may address the thermal condition by applying a reactive thermal mitigation technique that reduces the processing power of core 3. Accordingly, core 3 slows its processing and begins to cool despite the continued dissipation of thermal energy by RF generator 168A. Subsequently, PLS module 109A may direct driver block 207A to queue future workload to core 3, even though it is running at a reduced power frequency, after leveraging data that indicates core 3 running at the reduced power frequency will cool to a certain temperature in a certain amount of time.

As a variation of the non-limiting example of a proactive load steering embodiment just described, core 3 may have been downgraded for work allocation due to excessive thermal energy dissipated by RF generator 168A. TPM module 101A may address the thermal condition by applying a reactive thermal mitigation technique that reduces the processing power of core 3. Accordingly, core 3 slows its processing and begins to cool despite the continued dissipation of thermal energy by RF generator 168A. Subsequently, PLS module 109A may dictate removal of the core's downgraded status after leveraging data that indicates core 3 running at the reduced power frequency will cool to a certain temperature in a certain amount of time.

Another non-limiting example of a proactive load steering embodiment in the context of the exemplary floor plan 300 includes a scenario in which RF generator 168A has a historical tendency to suddenly generate spikes of thermal energy. Or, to further the example, RF generator 168A may have a historical tendency to spike in thermal energy generation during certain periods of time, perhaps attributable to user patterns of use. In such a situation, to avoid a collision of thermal energy generation by RF generator 168A and core 3 that could result in a detrimental thermal condition, proactive load steering module 109A may leverage the predictive information to direct driver block 207A to allocate only short computational loads to core 3 during the certain time periods.

Figure 4:
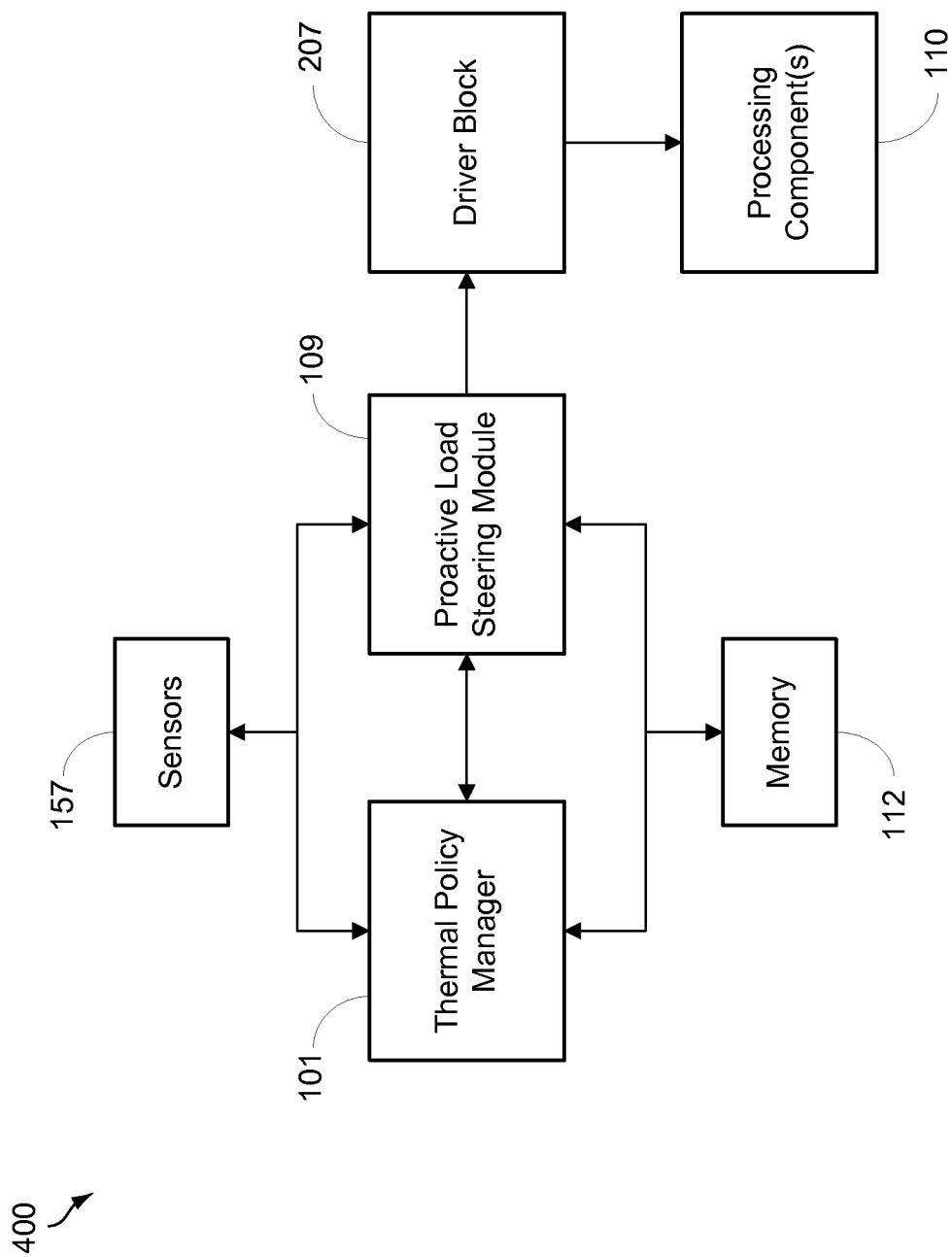
FIG. 4 is a functional block diagram illustrating respective logical connections between a thermal policy manager ("TPM"), a proactive load steering ("PLS"), a driver block, a processing component, a memory and sensors of the chip illustrated in FIG. 2.

FIG. 4 is a functional block diagram illustrating respective logical connections between a thermal policy manager ("TPM") 101, a proactive load steering ("PLS") module 109, a driver block 207, a processing component 110, a memory 112 and sensors 157 of the chip illustrated in FIG. 2. The TPM 101 may be in communication with temperature sensors 157 via an intermediary component such as monitoring module 114 (not depicted in FIG. 4), but such an arrangement is not a required aspect for all embodiments. Similarly, the PLS module 109 may also be in communication with temperature sensors 157 either directly or via an intermediary component.

The TPM 101 receives inputs from temperature sensors 157 that may indicate a thermal energy condition warranting the application of a reactive thermal mitigation technique. In one exemplary embodiment, the TPM 101 may determine that a core of CPU 110 should be "clocked" such that the power frequency of CPU 110 is reduced to a level that may mitigate the present consumption rate of active power by CPU 110. The suggested reduced power frequency, as determined by the TPM 101, may be forwarded to the PLS module 109 before application to the CPU 110.

Upon receipt of instructions from the TPM 101 to reduce the frequency of CPU 110, PLS module 109 may query memory 112 for historical data, verify temperature readings from sensors 157 and/or consider other thermal factors associated with chip 102. PLS module 109 may then weight the factors before determining whether to override the TPM 101 instructions, modify the TPM 101 instructions or apply the TPM 101 instructions. Alternatively, in some embodiments, PLS module 109 may not operate as a filter or "tuner" of thermal mitigation techniques dictated by the TPM 101 but, rather, simply direct driver block 207 to allocate workload based on thermal factors that include reactive measures applied by the TPM 101. More detail concerning the implementation of a PLS module thermal preemption technique is discussed below in connection with FIGS. 5 and 6.

Figure 5:
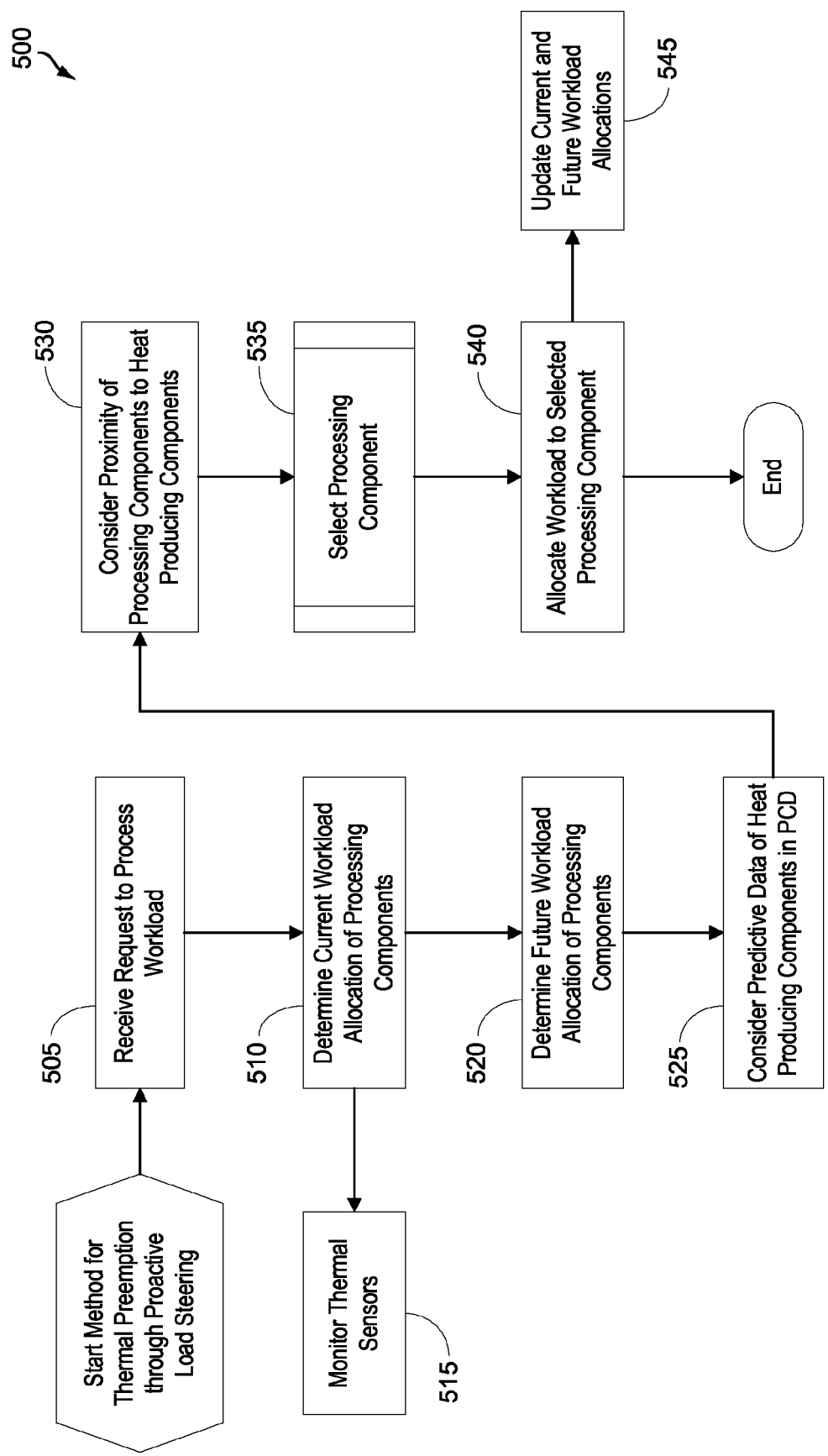
FIG. 5 is a logical flowchart illustrating a method for preempting thermal generation thresholds by proactive load steering in a PCD.

FIG. 5 is a logical flowchart illustrating a method 500 for preempting thermal generation thresholds by proactive load steering in a PCD 100. At block 505, a request to process a workload is received. Subsequently, at blocks 510 through 530, a proactive load steering module 109 may determine or consider any number of thermal factors within PCD 100 that will be weighted in selection of a processing component to service the workload. More specifically, at block 510, a PLS module 109 may determine the current processing loads allocated to various processing components within a PCD 100. Notably, current process loads may be determined or inferred any number of ways including, but not limited to, querying historical data representing previously allocated processing tasks, verifying power frequencies or currents associated with processing components and monitoring thermal sensors proximate to various processors (block 515).

At block 520, data representing future or queued workloads may be considered and weighted so that allocation of the present workload does not overburden a processor to a point of creating a detrimental thermal condition. At block 525, predictive data associated with other thermal energy generating components internal to, or external to, chip 102 may be considered in order to weight current temperature readings associated with such components. For example, a relatively "cool" RF generator 168 near core 222 may be weighted in a proactive load steering algorithm to indicate that it may spike in thermal energy generation.

Advantageously, by weighting a factor associated with the RF generator 168, for example, a PLS module 109 may determine that a long, involved workload should be allocated to a different core 224, thereby reducing the probability that a thermal threshold will be reached when core 222 overheats during the processing of the workload due to a thermal energy spike from RF generator 168.

Similar to block 525, at block 530, the physical arrangement of chip 102 may be considered in order to weight a processing component's eligibility for workload allocation based on the processing core's proximity to other on-chip and off-chip components within the PCD 100.

At block 535, a sub-routine may run a proactive load steering algorithm, which considers one or more of the determined thermal factors, to select a processing component for workload allocation. Once selected, at block 540, the PLS module 109 may direct a driver block 207 to allocate the requested workload to the selected processing component. Further, in some embodiments, the allocation of the workload to the selected processing component may trigger, at block 545, that historical data representative of queued workload be updated for consideration by future proactive load steering routines.

Figure 6:
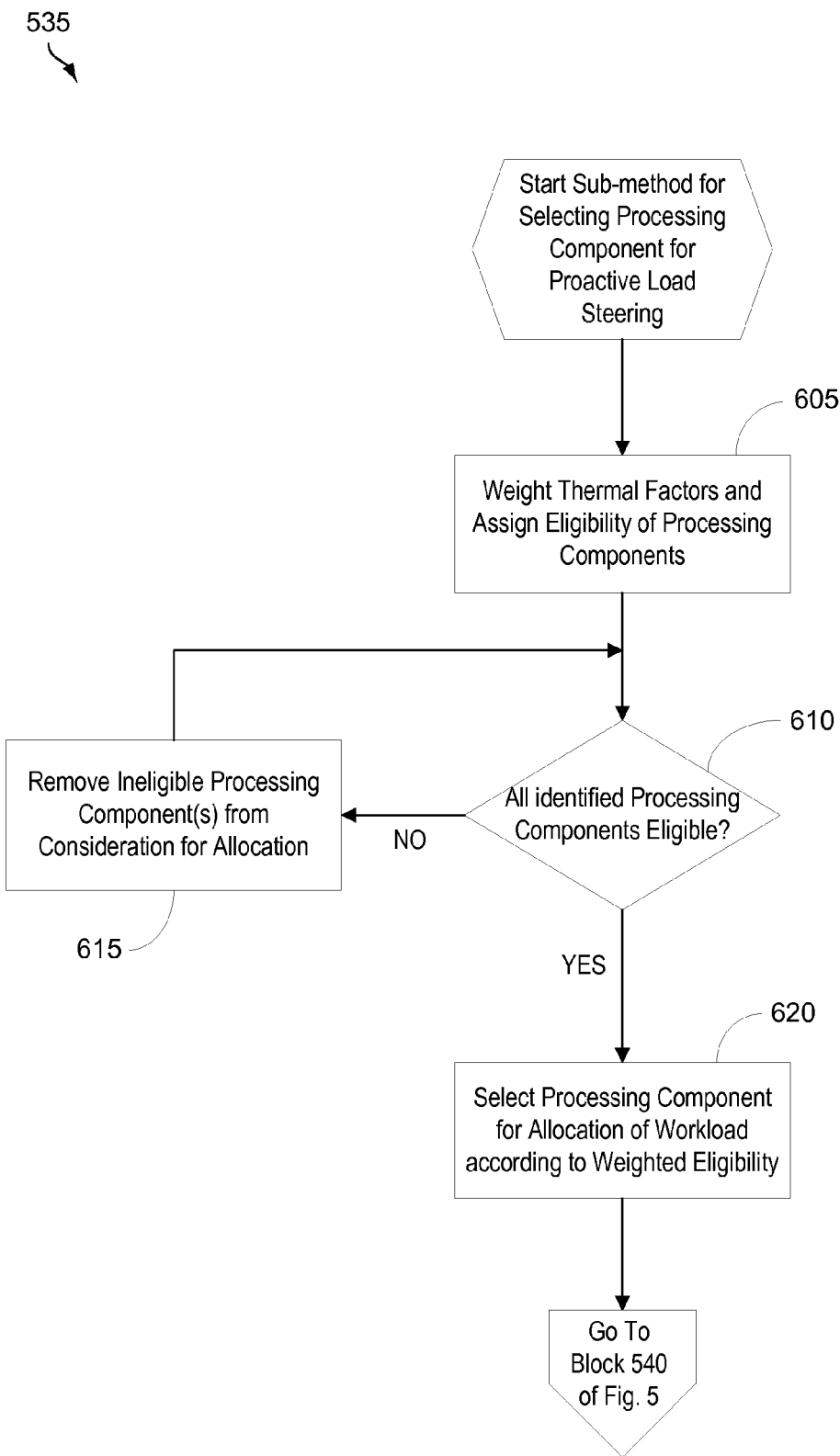
FIG. 6 is a logical flowchart illustrating a sub-method or subroutine for selecting a processing component in a PCD to be allocated a workload per a proactive load steering embodiment.

FIG. 6 is a logical flowchart illustrating a sub-method or subroutine 535 for selecting a processing component in a PCD 100 to be allocated a workload per a proactive load steering embodiment. At block 605, the thermal factors determined and considered in blocks 510-530 are weighted and an eligibility factor is assigned for each processing component in PCD 100. At decision block 610, based on the eligibility factor, it may be determined that certain processing components are not suitable for allocation of the workload. For instance, the eligibility factor may indicate that a given processing component should not be allocated additional workload. That is, in some embodiments of a proactive load steering technique, a thermal factor "floor" may be set such that processing components having a thermal factor below the floor are not considered for allocation. If certain processing components are determined to be ineligible for workload allocation, at block 615 such processing components may be removed from consideration.

If, at block 610, all processing components are eligible for consideration, at block 620 one or more processing components may be selected for allocation of the workload wherein the selection is based on the weighted actual and predictive thermal factors. Once selected at block 620, the method returns to block 540 of FIG. 5.

Notably, by selecting a processing component based on a proactive load steering technique, one of ordinary skill in the art will recognize that workload may be allocated to a processing component that otherwise wouldn't have been selected using traditional scheduling algorithms. Advantageously, because a proactive load steering algorithm considers past, present and future thermal factors associated with processing components on a PCD 100, the overall thermal footprint of the PCD 100 may be managed such that the necessity to implement reactive thermal mitigation techniques, which may negatively impact QoS, is reduced.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", "subsequent", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium.

In the context of this document, a computer-readable medium is an electronic, magnetic, optical, or other physical device or means that may contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" may include any means that may store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

Computer-readable media include both computer storage media and communication media including any medium that facilitates transfer of a computer program from one place to another. A storage media may be any available media that may be accessed by a computer. By way of example, and not limitation, such computer-readable media may comprise any optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for maximizing a quality of service ("QoS") level in a portable computing device ("PCD") by preempting the generation of thermal energy in excess of a threshold, the method comprising:
    receiving a workload request for allocation to one or more processing components in the PCD;
    determining thermal factors comprising predictive data associated with heat producing components in the PCD, wherein the predictive data indicates potential for generation of thermal energy by the heat producing components;
    determining thermal factors comprising proximity of the heat producing components to the processing components;
    based on the thermal factors, assigning an eligibility factor to each of the processing components;
    based on the eligibility factors, selecting a processing component for allocation of the workload; and
    allocating the workload to the selected processing component.

2. The method of claim 1, further comprising determining thermal factors associated with current workloads of the processing components.

3. The method of claim 2, wherein the current workloads are determined by monitoring the power frequency provided to the processors.

4. The method of claim 2, wherein the current workloads are determined by monitoring the current provided to the processors.

5. The method of claim 1, further comprising determining thermal factors associated with thermal sensor measurements associated with the processing components.

6. The method of claim 1, further comprising determining thermal factors associated with future workloads of the processing components.

7. The method of claim 1, further comprising updating the future workload queue for the selected processor.

8. The method of claim 1, wherein the predictive data associated with heat producing components in the PCD comprises data associated with a use pattern of the PCD.

9. The method of claim 1, wherein the heat producing component is internal to a chip comprising the processing components.

10. The method of claim 1, wherein the heat producing component is external to a chip comprising the processing components.

11. A computer system for maximizing a quality of service ("QoS") level in a portable computing device ("PCD") by preempting the generation of thermal energy in excess of a threshold, the system comprising:

a proactive load steering ("PLS") module operable to:
  receive a workload request for allocation to one or more processing components in the PCD;
  determine thermal factors comprising predictive data associated with heat producing components in the PCD, wherein the predictive data indicates potential for generation of thermal energy by the heat producing components;
  determine thermal factors comprising proximity of the heat producing components to the processing components;
  based on the thermal factors, assign an eligibility factor to each of the processing components;
  based on the eligibility factors, select a processing component for allocation of the workload; and
  direct a driver block to allocate the workload to the selected processing component.

12. The computer system of claim 11, wherein the PLS module is further operable to determine thermal factors associated with current workloads of the processing components.

13. The computer system of claim 12, wherein the current workloads are determined by monitoring the power frequency provided to the processors.

14. The computer system of claim 12, wherein the current workloads are determined by monitoring the current provided to the processors.

15. The computer system of claim 11, wherein the PLS module is further operable to determine thermal factors associated with thermal sensor measurements associated with the processing components.

16. The computer system of claim 11, wherein the PLS module is further operable to determine thermal factors associated with future workloads of the processing components.

17. The computer system of claim 11, wherein the PLS module is further operable to update the future workload queue for the selected processor.

18. The computer system of claim 11, wherein the predictive data associated with heat producing components in the PCD comprises data associated with a use pattern of the PCD.

19. The computer system of claim 11, wherein the heat producing component is internal to a chip comprising the processing components.

20. The computer system of claim 11, wherein the heat producing component is external to a chip comprising the processing components.

21. A computer system for maximizing a quality of service ("QoS") level in a portable computing device ("PCD") by preempting the generation of thermal energy in excess of a threshold, the system comprising:
  means for receiving a workload request for allocation to one or more processing components in the PCD;
  means for determining thermal factors comprising predictive data associated with heat producing components in the PCD, wherein the predictive data indicates potential for generation of thermal energy by the heat producing components;
  means for determining thermal factors comprising proximity of the heat producing components to the processing components;
  means for assigning, based on the thermal factors, an eligibility factor to each of the processing components;
  means for selecting, based on the eligibility factors, a processing component for allocation of the workload; and
  means for allocating the workload to the selected processing component.

22. The computer system of claim 21, further comprising means for determining thermal factors associated with current workloads of the processing components.

23. The computer system of claim 22, wherein the current workloads are determined by monitoring the power frequency provided to the processors.

24. The computer system of claim 22, wherein the current workloads are determined by monitoring the current provided to the processors.

25. The computer system of claim 21, further comprising means for determining thermal factors associated with thermal sensor measurements associated with the processing components.

26. The computer system of claim 21, further comprising means for determining thermal factors associated with future workloads of the processing components.

27. The computer system of claim 21, further comprising means for updating the future workload queue for the selected processor.

28. The computer system of claim 21, wherein the predictive data associated with heat producing components in the PCD comprises data associated with a use pattern of the PCD.

29. The computer system of claim 21, wherein the heat producing component is internal to a chip comprising the processing components.

30. The computer system of claim 21, wherein the heat producing component is external to a chip comprising the processing components.

31. A computer program product comprising a non-transitory computer usable medium having a computer readable program code embodied therein, said computer readable program code adapted to be executed to implement a method for maximizing a quality of service ("QoS") level in a portable computing device ("PCD") by preempting the generation of thermal energy in excess of a threshold, said method comprising:
  receiving a workload request for allocation to one or more processing components in the PCD;
  determining thermal factors comprising predictive data associated with heat producing components in the PCD, wherein the predictive data indicates potential for generation of thermal energy by the heat producing components;
  determining thermal factors comprising proximity of the heat producing components to the processing components;
  based on the thermal factors, assigning an eligibility factor to each of the processing components;
  based on the eligibility factors, selecting a processing component for allocation of the workload; and
  allocating the workload to the selected processing component.

32. The computer program product of claim 31, further comprising determining thermal factors associated with current workloads of the processing components.

33. The computer program product of claim 32, wherein the current workloads are determined by monitoring the power frequency provided to the processors.

34. The computer program product of claim 32, wherein the current workloads are determined by monitoring the current provided to the processors.

35. The computer program product of claim 31, further comprising determining thermal factors associated with thermal sensor measurements associated with the processing components.

36. The computer program product of claim 31, further comprising determining thermal factors associated with future workloads of the processing components.

37. The computer program product of claim 31, further comprising updating the future workload queue for the selected processor.

38. The computer program product of claim 31, wherein the predictive data associated with heat producing components in the PCD comprises data associated with a use pattern of the PCD.

39. The computer program product of claim 31, wherein the heat producing component is internal to a chip comprising the processing components.

40. The computer program product of claim 31, wherein the heat producing component is external to a chip comprising the processing components.

* * * * *